United States Patent
Lee

(10) Patent No.: US 9,614,208 B2
(45) Date of Patent: Apr. 4, 2017

(54) BATTERY PACK WITH DEGASSING COVER AND PLATE THEREON

(75) Inventor: Hyun-Ye Lee, Yongin-si (KR)

(73) Assignees: Samsung SDI Co., Ltd., Yongin-si (KR); Robert Bosch GmbH, Stattgart (DE)

(*) Notice: Subject to any disclaimer, the term of this patent is extended or adjusted under 35 U.S.C. 154(b) by 936 days.

(21) Appl. No.: 13/438,736

(22) Filed: Apr. 3, 2012

(65) Prior Publication Data

US 2013/0089763 A1 Apr. 11, 2013

Related U.S. Application Data

(60) Provisional application No. 61/545,382, filed on Oct. 10, 2011.

(51) Int. Cl.

| | |
|---|---|
| H01M 2/12 | (2006.01) |
| H01M 2/02 | (2006.01) |
| H01M 2/10 | (2006.01) |
| H01M 10/6563 | (2014.01) |
| H01M 10/647 | (2014.01) |
| H01M 10/613 | (2014.01) |

(52) U.S. Cl.
CPC ....... *H01M 2/1235* (2013.01); *H01M 2/0245* (2013.01); *H01M 2/1077* (2013.01); *H01M 10/613* (2015.04); *H01M 10/647* (2015.04); *H01M 10/6563* (2015.04)

(58) Field of Classification Search
CPC ...... H01M 2/1077; H01M 2/206; H01M 2/12; H01M 2/1252
USPC .............. 429/53, 149, 160, 148, 71
See application file for complete search history.

(56) References Cited

U.S. PATENT DOCUMENTS

| | | | |
|---|---|---|---|
| 1,922,082 A | 8/1933 | Dunzweiler | |
| 4,562,126 A | 12/1985 | Chartrain et al. | |
| 5,256,502 A | 10/1993 | Kump | |
| 6,197,446 B1 | 3/2001 | Fukuda et al. | |
| 6,569,561 B1 | 5/2003 | Kimura et al. | |
| 7,654,351 B2 | 2/2010 | Koike et al. | |
| 8,748,021 B2 * | 6/2014 | Lim ................................ | 429/82 |
| 2005/0147874 A1 | 7/2005 | Andersen et al. | |
| 2009/0047574 A1 | 2/2009 | Hellmann | |
| 2010/0081048 A1 | 4/2010 | Nansaka et al. | |

(Continued)

FOREIGN PATENT DOCUMENTS

| | | |
|---|---|---|
| CN | 1300107 A | 6/2001 |
| CN | 1874051 A | 12/2006 |

(Continued)

OTHER PUBLICATIONS

EPO Office Action dated Jan. 28, 2013 issued in European Patent Application No. 12178093.6, 7 pages.

(Continued)

*Primary Examiner* — Gary Harris
(74) *Attorney, Agent, or Firm* — Lewis Roca Rothgerber Christie LLP

(57) ABSTRACT

A battery pack including at least one battery module including: a plurality of battery cells arranged in a direction, each of the battery cells including a vent; and a cover covering the plurality of battery cells and including a degassing cover covering the vents; and a cover plate on the degassing cover, at least a portion of the degassing cover having a rigidity less than a rigidity of the cover plate.

18 Claims, 3 Drawing Sheets

(56) References Cited

U.S. PATENT DOCUMENTS

| | | |
|---|---|---|
| 2010/0092859 A1 | 4/2010 | Kim et al. |
| 2010/0116570 A1 | 5/2010 | Sugawara et al. |
| 2010/0215998 A1* | 8/2010 | Byun et al. ............ 429/82 |
| 2011/0024205 A1* | 2/2011 | Nishihara ......... H01M 10/48 180/65.1 |
| 2011/0024207 A1* | 2/2011 | Higashino et al. ......... 180/65.1 |
| 2011/0104556 A1 | 5/2011 | Kim et al. |

FOREIGN PATENT DOCUMENTS

| | | | |
|---|---|---|---|
| CN | 101989652 A | | 3/2011 |
| EP | 1 059 679 | | 12/2000 |
| JP | 58-103787 | | 6/1983 |
| JP | 2010-108788 | | 5/2010 |
| JP | 2010-205509 | | 9/2010 |
| JP | 2010205509 A | * | 9/2010 |
| JP | 2010-287514 | | 12/2010 |
| JP | 2011014321 A | * | 1/2011 |
| JP | 2011-49158 | | 3/2011 |
| KR | 2003-0017821 | | 3/2003 |
| KR | 10-2006-0027674 | | 3/2006 |
| KR | 10-2008-0022423 | | 3/2008 |
| KR | 10-2008-0054097 | | 6/2008 |
| KR | 10-2010-0097404 | | 9/2010 |

OTHER PUBLICATIONS

EPO Search Report dated Oct. 31, 2011 for European Patent application 11173734.2, (4 pages).

SIPO Office action dated Nov. 18, 2013, w/English translation, for Chinese Patent application 201110126420.0, (16 pages).

U.S. Office action dated Oct. 17, 2011, for cross reference U.S. Appl. No. 12/977,861, (12 pages).

SIPO Office action dated Dec. 24, 2015, with English translation, corresponding to Chinese Patent application 201210134642.1, (17 pages).

KIPO Office action dated Feb. 1, 2016, for Korean Patent application 10-2012-0048594, (6 pages).

* cited by examiner

BATTERY PACK WITH DEGASSING COVER AND PLATE THEREON

CROSS-REFERENCE TO RELATED APPLICATIONS

This application claims priority to and the benefit of U.S. Provisional Application No. 61/545,382, filed on Oct. 10, 2011 in the United States Patent and Trademark Office, the entire content of which is incorporated herein by reference.

BACKGROUND

1. Field

Aspects of embodiments of the present invention relate to a battery pack.

2. Description of the Related Art

In general, a secondary cell may be used repeatedly by charging and discharging and is configured as a battery cell for use in portable small electronic equipment such as cell phones, notebooks, computers, cameras, camcorders, etc., or is configured as a battery pack including a plurality of battery cells for use as a power supply for driving a motor of a hybrid electric vehicle (HEV), an electric vehicle (EV), or other device using high power.

The battery pack may be used as a power supply for driving a high-power motor and may produce a large amount of heat by charging and discharging operations. Such heat may deteriorate the battery cells. Therefore, the battery pack having a structure using air of a vehicle interior as a cooling medium has been used.

When the battery pack having such a structure is mounted in the vehicle interior or a trunk space, gas or dust of harmful components generated from the battery cells may be quickly introduced into the vehicle interior due to heating, ignition, or abnormal operation of the battery cell. In this case, serious problems such as accidents caused by a driver's affected view or bodily injury due to inhalation of harmful gas may be caused.

SUMMARY

According to an aspect of embodiments of the present invention, a battery pack has improved stability due to materials having different rigidity in a top cover formed with a degassing cover discharging the gas having harmful components generated from one or more battery cells of the battery, and implements a gas discharging structure of the level of the battery pack. As such, battery packs according to embodiments of the present invention are particularly applicable as a motor-driving power source for propelling hybrid vehicles or electric vehicles.

According to an embodiment of the present invention, a battery pack includes: at least one battery module including: a plurality of battery cells arranged in a direction, each of the battery cells including a vent; and a cover covering the plurality of battery cells and including a degassing cover covering the vents; and a cover plate on the degassing cover, at least a portion of the degassing cover having a rigidity less than a rigidity of the cover plate.

The degassing cover may have a cavity that is open on a first side facing the vents, the cavity being defined on a second side opposite the first side by a part of the degassing cover having a rigidity less than the rigidity of the cover plate. The cavity may be adapted to receive gas discharged from the vents.

A battery pack may further include an insulating member on the battery cells and having a plurality of openings corresponding to the vents, and the degassing cover may contact the insulating member. The degassing cover may include a discharge portion connected to a through hole of the degassing cover and having a discharge hole. The plurality of openings may be adapted to form a gas passage from the vents to the through hole of the degassing cover. The discharge hole may include a pair of discharge holes that are opposite each other.

A battery pack may further include a bus bar cover covering terminals of the battery cells and bus bars connecting the terminals, and the bus bar cover may have a rigidity greater than the rigidity of the cover plate. The degassing cover and the bus bar cover may be integrally formed. The cover plate may be fastened to the bus bar cover.

A battery pack may further include a first end plate and a second end plate at opposite outermost ends of the plurality of battery cells, and the degassing cover may include a first fastening portion and a second fastening portion at opposite ends of the degassing cover, the first and second fastening portions being respectively mounted to the first and second end plates.

The first end plate may include a first protrusion coupled to the first fastening portion, and the second end plate may include a second protrusion coupled to the second fastening portion.

The battery pack may further include at least one side plate coupled between the first and second end plates. The bus bar cover may include a connecting portion fastened to the at least one side plate.

A battery pack may further include a housing accommodating the at least one battery module. The housing may include an inlet for receiving a cooling medium into the housing, and an outlet for discharging the cooling medium from the housing. The battery pack may further include a ventilation fan configured to move the cooling medium from the inlet to the outlet.

Gas discharged from the vents may be discharged from the at least one battery module in a direction toward the outlet. At least one of the degassing cover or the cover plate may be configured to break and release the gas into the housing when one or more of the vents are broken.

A battery pack may further include at least one barrier between two adjacent ones of the battery cells, and a plurality of spacers may be at a side of the at least one barrier facing a side of a corresponding one of the battery cells.

According to another embodiment of the present invention, a battery pack includes at least one battery module having vents discharging gas and a plurality of battery cells aligned in one direction, and a top cover having a degassing cover covering the vents and a cover plate arranged above the degassing cover. In the battery pack, at least a portion of the degassing cover consists of materials of rigidity weaker than a rigidity of the cover plate.

A bus bar cover connected to the degassing cover and accommodating a bus bar of the battery cells may be further provided between the battery module and the cover plate.

The cover plate may consist of materials of rigidity weaker than a rigidity of the bus bar cover.

The degassing cover may have a generally hexahedral shape such that the inside thereof is open in one direction, and is seated to the battery cells such that the open surface of the degassing cover faces the vents.

An opposing surface facing the open surface of the degassing cover may be made of materials of rigidity weaker than the rigidity of the cover plate.

An insulating member interposed between the vent and the degassing cover may be further provided.

The insulating member may provide a plurality of openings to the portion corresponding to the vents.

The degassing cover may closely contact the insulating member to form a flow passage of the gas.

One side of the degassing cover may be further provided with a discharge portion connected to the flow passage of the gas, and a discharge hole discharging the gas.

The battery pack may further include a housing accommodating the battery module, and the housing may include an inlet introducing air of the vehicle interior to a refrigerant, and an outlet connected to the vehicle exterior and discharging the gas or the used refrigerant generated from the battery cell to the vehicle exterior.

When one or more of the vents are burst, the degassing cover or the cover plate is burst. Therefore, the gas or the used refrigerant may be discharged to the outlet.

A ventilation fan assisting the discharge of the refrigerant may be connected to the outlet.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

Figure 1:
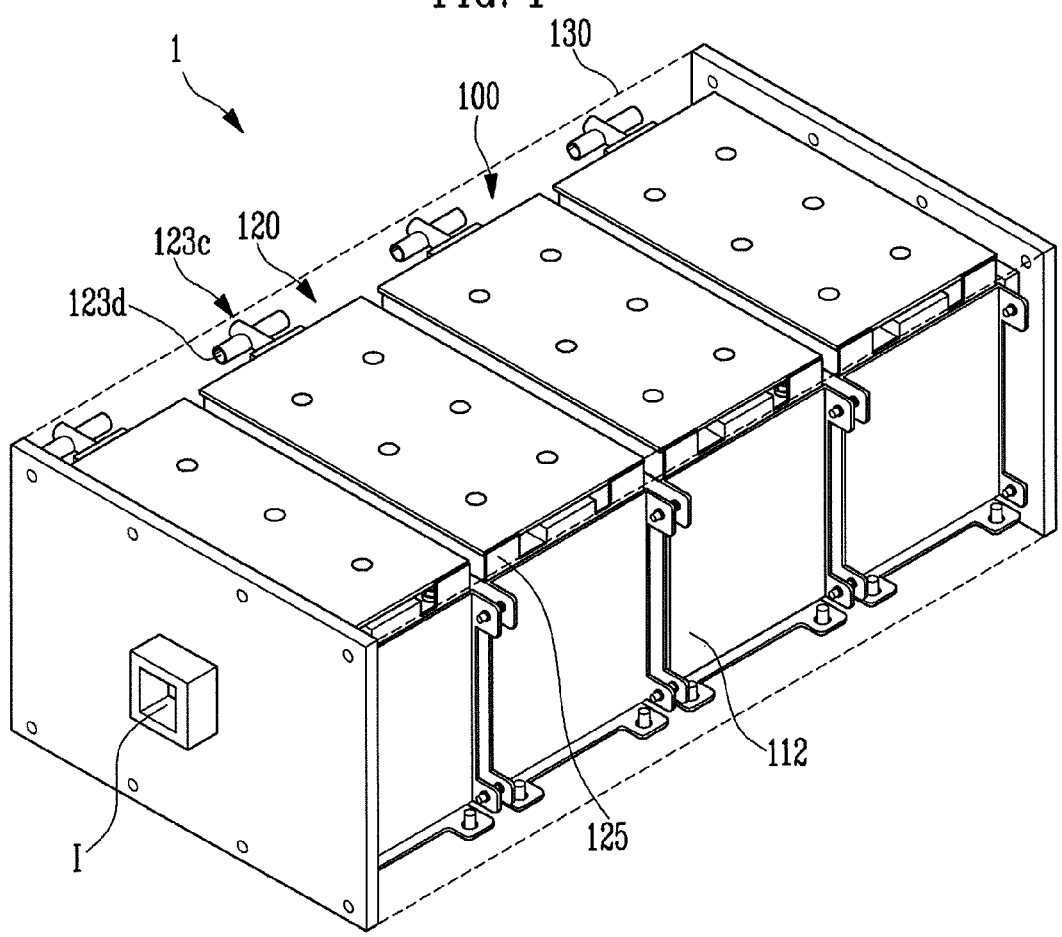
FIG. 1 is a schematic perspective view of a battery pack according to an exemplary embodiment of the present invention.

In the following detailed description, certain exemplary embodiments of the present invention are shown and described by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or indirectly on the another element with one or more intervening elements interposed therebetween. Similarly, when an element is referred to as being "connected to" another element, it can be directly connected to the another element or indirectly connected to the another element with one or more intervening elements interposed therebetween. Hereinafter, like reference numerals refer to like elements.

Some exemplary embodiments of the present invention are described below with reference to the drawings.

Figure 2:
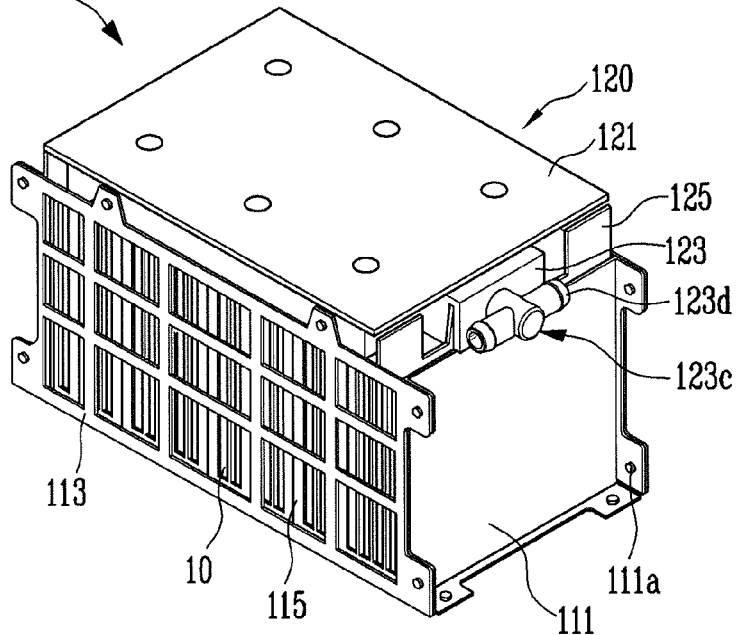
FIG. 2 is a schematic perspective view of a battery module included in the battery pack of FIG. 1.
Figure 3:
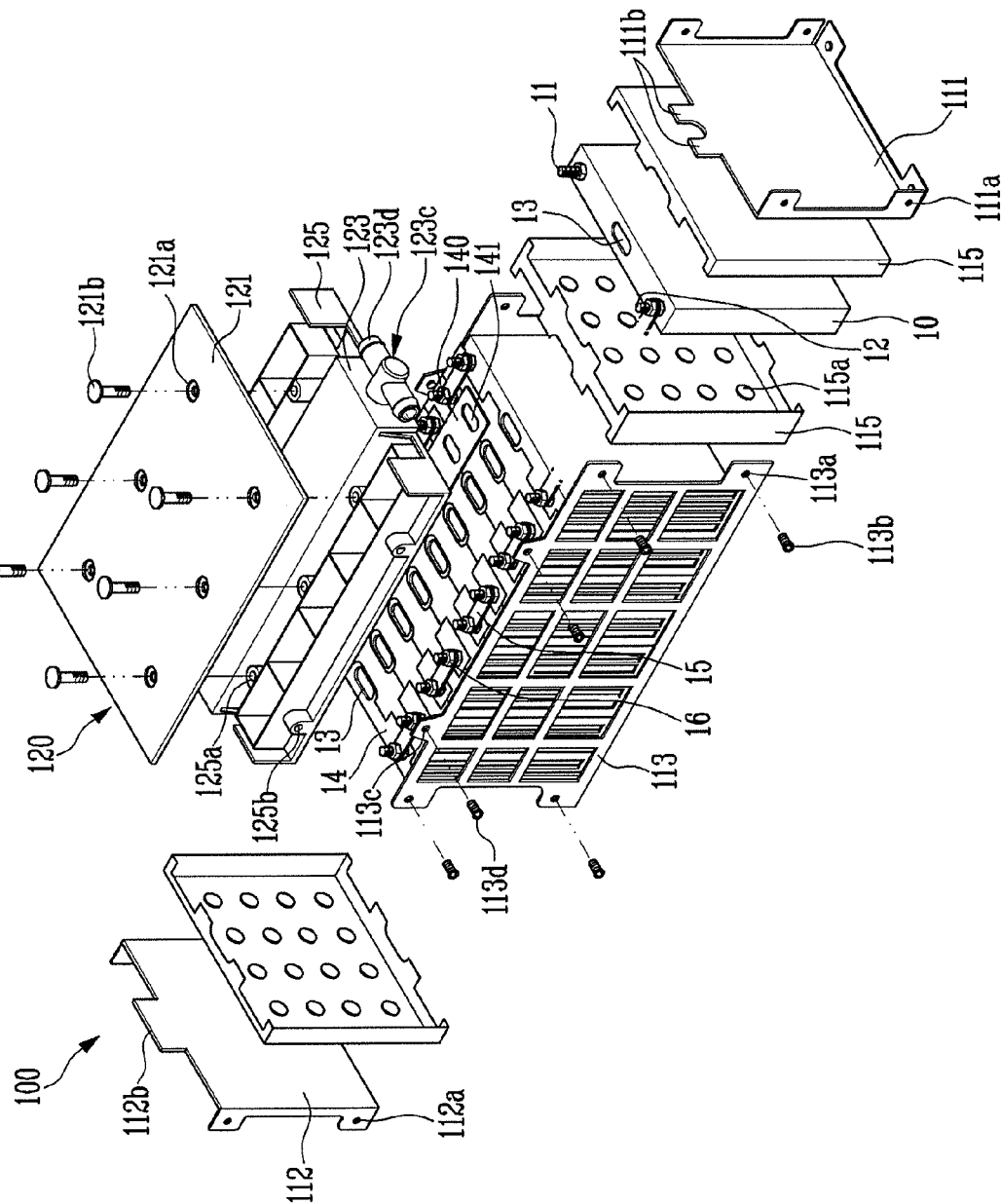
FIG. 3 is an exploded perspective view of the battery module of FIG. 2.
Figure 4:
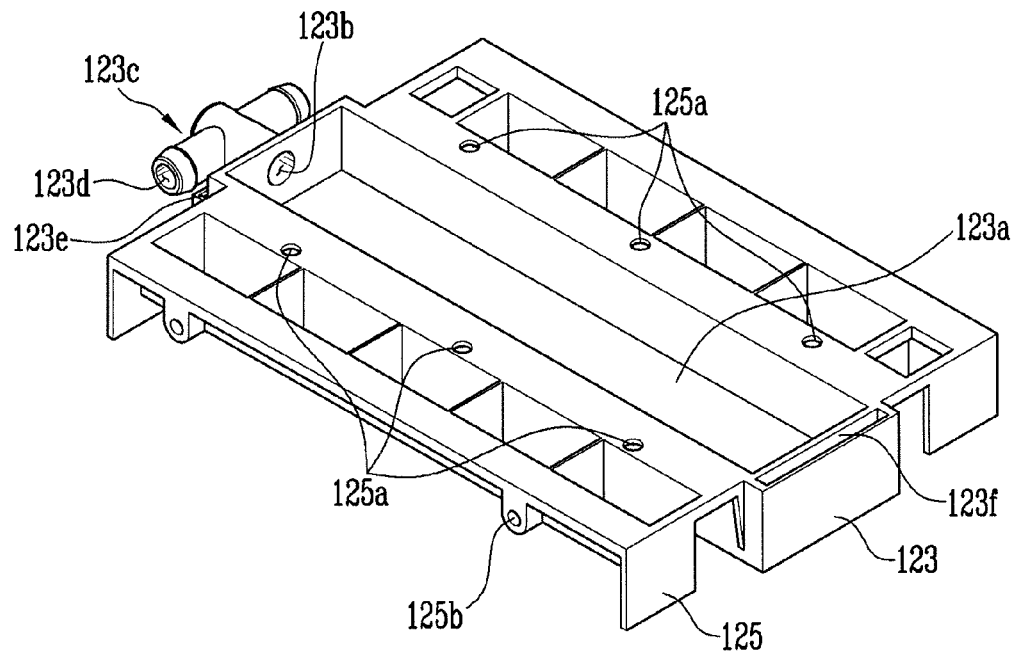
FIG. 4 is a bottom perspective view of a degassing cover and a bus bar cover of the battery module of FIG. 2.
Figure 5:
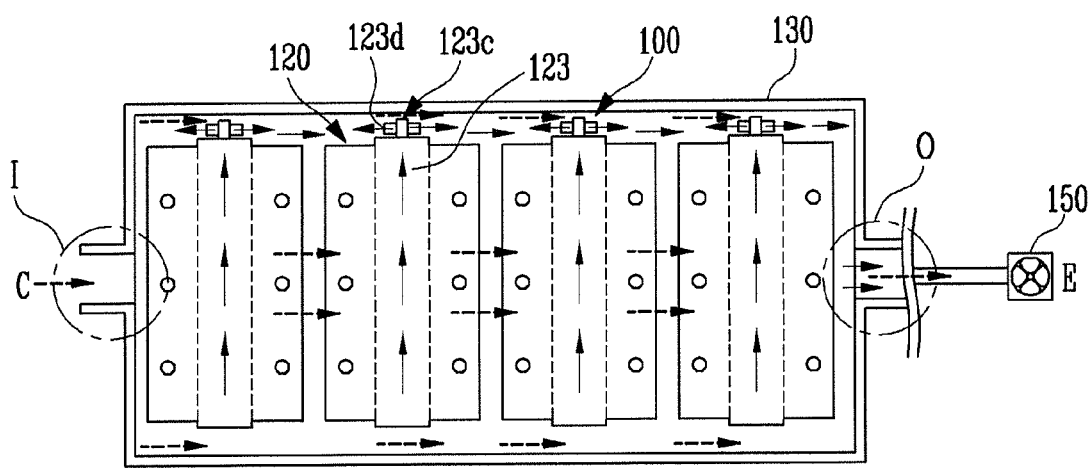
FIG. 5 is a schematic top view showing flow patterns of vehicle interior air used as a cooling medium in the battery pack of FIG. 1 and harmful gas generated from battery cells of the battery pack.

FIG. 1 is a schematic perspective view of a battery pack according to an exemplary embodiment of the present invention; FIG. 2 is a schematic perspective view of a battery module included in the battery pack of FIG. 1; FIG. 3 is an exploded perspective view of the battery module of FIG. 2; FIG. 4 is a bottom perspective view of a degassing cover and a bus bar cover of the battery module of FIG. 2; and FIG. 5 is a schematic top view showing flow patterns of vehicle interior air used as a cooling medium in the battery pack of FIG. 1 and harmful gas generated from battery cells of the battery pack.

Referring to FIGS. 1 to 5, a battery pack 1 according to an exemplary embodiment of the present invention includes at least one battery module 100 including a plurality of battery cells 10 aligned in a direction and having vents 13 for discharging gas, and a top cover 120 having a degassing cover 123 covering the vents 13 and a cover plate 121 arranged above the degassing cover 123. At least a portion of the degassing cover 123 is made of one or more materials of rigidity weaker than a rigidity of the cover plate 121.

Referring to FIGS. 1 to 5, the battery pack 1, in one embodiment, further includes a housing 130 accommodating at least one battery module 100, and the housing 130 includes an inlet "I" and an outlet "O." The battery module 100 accommodated in the housing 130 may be aligned such that lateral, or wide, faces of the battery cells 10 face each other.

In one embodiment, a bus bar cover 125, connected to the degassing cover 123 and covering a cathode terminal 11, an anode terminal 12, and a bus bar 15 of the battery cells 10, is further provided between the battery cells 10 and the cover plate 121. In one embodiment, the cover plate 121 is made of one or more materials of rigidity weaker than a rigidity of the bus bar cover 125.

Referring to FIGS. 1 to 3, the top cover 120 including the degassing cover 123 is arranged above the battery cells 10, and an insulating member 140 consisted of a material such as a gasket material is interposed between the vents 13 of the battery cells 10 and the degassing cover 123. The insulating member 140, in one embodiment, is an integrated-type insulating member having a plurality of openings 141 at portions corresponding to the vents 13. In one embodiment, a size of the respective openings 141 may be larger than a size of the respective vents 13. In one embodiment, the cover plate 121 is downwardly connected to the bus bar cover 125 through a cover plate fastening hole 121a and a cover plate fastening member 121b.

The battery cells 10 may include a battery case having an opening and a cap plate 14 covering the opening. The battery case accommodates an electrode assembly having a cathode plate, an anode plate, and a separator interposed between the cathode plate and the anode plate, and electrolytes. In one embodiment, the cathode terminal 11 is connected to the cathode plate, and the anode terminal 12 is connected to the anode plate, and are protruded to the outside at respective ends of the cap plate 14. The cathode plate and the anode plate of the electrode assembly react with the electrolytes to generate energy, and the energy is transferred to the outside through the cathode terminal 11 and the anode terminal 12.

In one embodiment, the vents 13 are formed between the cathode terminal 11 and the anode terminal 12 on the cap plate 14. When gas pressure generated from inside the battery cells 10 increases above a certain pressure (e.g., a predetermined pressure), the vents 13 function as a passage discharging the gas from the battery cells 10, which prevents or substantially prevents the battery cells 10 from being destroyed due to the internal pressure.

A plurality of the battery cells 10 may be aligned in one direction. In one embodiment, wide, or lateral, sides of the battery cells 10 are aligned side by side to face each other and are accommodated between a pair of a first end plate 111 and a second end plate 112 arranged to be spaced apart from each other. In one embodiment, the first end plate 111 and the second end plate 112 are surface-contacted with outermost battery cells 10, respectively, to apply pressure to the plurality of battery cells 10 in a direction toward the inside of the plurality of battery cells 10. In one embodiment, opposite sides (e.g., narrow sides) of the battery cells 10 are accommodated by a side plate 113 (e.g., a bracket). The side plate 113, in one embodiment, is connected to one end and another end of the first end plate 111 and the second end plate 112 to support both sides of the plurality of battery cells 10.

In one embodiment, a first end plate fastening hole 111a formed in the first end plate 111 and a first side plate fastening hole 113a formed in the side plate 113 face each other to receive a first side plate fastening member 113b, such that the first end plate 111 is fastened to the side plate 113. Further, a second end plate fastening hole 112a formed in the second end plate 112 and a first side plate fastening hole 113a formed in the side plate 113 face each other to receive a first side plate fastening member 113b, such that the second end plate 112 is fastened to the side plate 113.

The vents 13 are formed in the center of the plurality of battery cells 10, and are arranged approximately in a line according to the aligned battery cells 10. The cathode terminal 11 and the anode terminal 12 of two battery cells 10 adjacent to each other are electrically connected to each other through a bus bar 15 made of nickel or another suitable material. The bus bar 15, in one embodiment, is provided with holes that are respectively penetrated by the cathode terminal 11 and the anode terminal 12, and the bus bar 15 penetrated by and connected to the cathode terminal 11 and the anode terminal 12 may be fixed by a member such as a nut 16, etc. A connection structure and the number of battery cells 10 of the battery module 100 according to the present invention may be varied according to a design of the battery module 100.

In one embodiment, a barrier 115 may be interposed between the battery cells 10. The barrier 115, in one embodiment, includes a spacer 115a to allow the battery cells 10 adjacent to each other to be spaced apart, and forms a space between the battery cells 10 to provide a passage for moving refrigerant cooling the battery cells 10.

Referring to FIGS. 3 and 4, the degassing cover 123, in one embodiment, has a generally hexahedral shape such that the inside thereof is open in one direction, and is seated to the insulating member 140 such that the open surface faces the vents 13. An opposing surface 123a facing the open surface of the degassing cover 123 is made of one or more materials of lesser rigidity than a rigidity of the cover plate 121. In one embodiment, a width of the insulating member 140 is greater than a width of the degassing cover 123, and gas leakage therefore does not occur when the degassing cover 123 closely contacts the insulating member 140 to form a flow passage of the gas. In one embodiment, a side of the degassing cover 123 is provided with a protruded discharge portion 123c connected to the flow passage of the gas and a through-hole 123b in communication with the flow passage of the gas. In one embodiment, both of opposite ends of the discharge portion 123c are provided with a discharge hole 123d for discharging the gas. A first fastening portion 123e of the degassing cover 123 is coupled or fastened to a protrusion 111b of the first end plate 111, and a second fastening portion 123f is coupled or fastened to a protrusion 112b of the second end plate 112.

In one embodiment, a top and a bottom of the bus bar cover 125 have a perforated-type partition wall, and the bus bar cover 125 connected to the degassing cover 123 may accommodate the cathode terminal 11 and the anode terminal 12, the bus bar 15, and the nut 16 of the battery cell 10. In one embodiment, one side of the bus bar cover 125 is provided with first bus bar cover fastening holes 125a adjacent with the bus bar cover 125. The first bus bar cover fastening holes 125a face the cover plate fastening holes 121a of the cover plate 121 and are fastened by the cover plate fastening member 121b. The other side of the bus bar cover 125 is provided with second bus bar cover fastening holes 125b adjacent with the bus bar cover 125. The second bus bar cover fastening holes 125b face second side plate fastening holes 113c formed in the side plate 113, and are fastened by a second side plate fastening member 113d. Accordingly, the bus bar cover 125 of the top cover 120 is fastened to the side plate 113 of the battery module 100.

The battery cells 10 may generate heat while performing charging and discharging. The battery pack 1 including the plurality of the battery cells 10 may be used as power supply for driving a high-power motor and, therefore, may generate a large amount of heat by charging or discharging operation. Such heat causes the temperature of the battery cells 10 to increase, thereby lowering performance of the battery cells 10 and causing stability problems. In one embodiment, as shown in FIG. 5, the battery cells 10 are cooled using air of a vehicle interior "C" as a cooling medium.

The air of the vehicle interior "C" indicated with dashed arrows is introduced at an inlet "I" to cool the battery cells 10 while passing a space between the plurality of battery cells 10 disposed in the inside of the battery pack 1. The introduced air of the vehicle interior "C" passes surroundings of the battery module 100 or the space between the plurality of battery cells 10 and is discharged to an outlet "O" connected to a vehicle exterior "E." In one embodiment, a ventilation fan 150 assisting the discharge of the air or refrigerant is connected to the outlet "O," such that the discharge of the air or refrigerant may be facilitated.

When a large amount of heat is generated from the battery cells 10 due to the charging or discharging operation or due to the battery cells 10 operating abnormally, the vents 13 of the battery cells 10 may be burst. As shown in FIG. 5, gas or dust of harmful components generated from the battery cells 10 is guided according to the gas flow of the degassing cover 123, as depicted by the arrow indicated by solid lines, and then is discharged to the discharge hole 123d. Therefore, the battery pack 1 has a gas discharging structure having the level of the battery module 100. Then, the gas or dust may be discharged to the outlet "O."

In contrast, when one or more of the vents 13 of the plurality of battery cells 10 are burst, the degassing cover 123 made of materials having the least rigidity among the cover plate 121, the bus bar cover 125, and the degassing cover 123 forming the top cover 120 is burst. Therefore, the gas or dust is directly discharged to the inside of the housing 130 and may be discharged to the outlet "O."

In addition, when the vents 13 of many large battery cells 10 are burst, the degassing cover 123 made of material having the least rigidity among the cover plate 121, the bus bar cover 125, and the degassing cover 123 is burst. Then, the cover plate 121 made of material having a greater rigidity than the degassing cover 123 but less rigidity than the bus bar cover 125 is burst and, therefore, the gas or dust is directly discharged to the inside of the housing 130 and may be discharged to the outlet "O." In this case, the battery pack 1 needs to have the gas discharging structure having the level of the battery cell 10, rather than the level of the battery module 100.

Similarly, when the vents 13 of many battery cells 10 are burst, the harmful gas or dust may be quickly discharged to the vehicle exterior "E" to eliminate or reduce the risk of introducing the harmful gas or dust to the vehicle interior "C" by applying materials having the rigidity different from each other to the top cover 120 and implementing the gas discharging structure having the level of the battery pack 1.

According to embodiments of the present invention, a battery pack has improved stability by applying materials having different rigidity to a top cover formed with the degassing cover discharging gas having harmful components generated from the battery cells, and therefore extends the degassing structure of the level of the battery module into a degassing structure of the level of the battery pack. As such, battery packs according to embodiments of the present invention are particularly applicable as a motor-driving power source for propelling hybrid vehicles or electric vehicles.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising at least one battery module comprising:
    a plurality of battery cells arranged in a direction, each of the battery cells comprising a vent;
    a cover covering the plurality of battery cells and comprising:
        a degassing cover covering the vents; and
        a cover plate on the degassing cover,
        wherein at least a portion of the degassing cover has a rigidity less than a rigidity of the cover plate; and
    a bus bar cover covering terminals of the battery cells and bus bars connecting the terminals, the bus bar cover having a rigidity greater than the rigidity of the cover plate,
    wherein the cover plate is fastened to the bus bar cover,
    wherein the battery pack further comprises a housing accommodating the at least one battery module therein, the housing enclosing the degassing cover and the cover plate.

2. The battery pack of claim 1, wherein the degassing cover has a cavity that is open on a first side facing the vents, the cavity being defined on a second side opposite the first side by a part of the degassing cover having a rigidity less than the rigidity of the cover plate.

3. The battery pack of claim 2, wherein the cavity is adapted to receive gas discharged from the vents.

4. The battery pack of claim 1, further comprising an insulating member on the battery cells and having a plurality of openings corresponding to the vents, wherein the degassing cover contacts the insulating member.

5. The battery pack of claim 4, wherein the degassing cover comprises a discharge portion connected to a through hole of the degassing cover and having a discharge hole.

6. The battery pack of claim 5, wherein the plurality of openings is adapted to form a gas passage from the vents to the through hole of the degassing cover.

7. The battery pack of claim 5, wherein the discharge hole comprises a pair of discharge holes that are opposite each other.

8. The battery pack of claim 1, wherein the degassing cover and the bus bar cover are integrally formed.

9. The battery pack of claim 1, further comprising a first end plate and a second end plate at opposite outermost ends of the plurality of battery cells, wherein the degassing cover comprises a first fastening portion and a second fastening portion at opposite ends of the degassing cover, the first and second fastening portions being respectively mounted to the first and second end plates.

10. The battery pack of claim 9, wherein the first end plate comprises a first protrusion coupled to the first fastening portion, and the second end plate comprises a second protrusion coupled to the second fastening portion.

11. The battery pack of claim 9, further comprising at least one side plate coupled between the first and second end plates.

12. The battery pack of claim 11, wherein the bus bar cover comprises a connecting portion fastened to the at least one side plate.

13. The battery pack of claim 1, wherein the housing includes an inlet for receiving a cooling medium into the housing, and an outlet for discharging the cooling medium from the housing.

14. The battery pack of claim 13, further comprising a ventilation fan configured to move the cooling medium from the inlet to the outlet.

15. The battery pack of claim 13, wherein gas discharged from the vents is discharged from the at least one battery module in a direction toward the outlet.

16. The battery pack of claim 1, further comprising at least one barrier between two adjacent ones of the battery cells, wherein a plurality of spacers are at a side of the at least one barrier facing a side of a corresponding one of the battery cells.

17. The battery pack of claim 1, wherein the cover plate is configured to burst such that a gas is directly discharged to an inside of the housing.

18. The battery pack of claim 1, wherein the degassing cover comprises a discharge portion connected to a through hole of the degassing cover and having a discharge hole, a gas passage being defined from the vents to an inside of the housing through the discharge hole.

* * * * *